March 16, 1954

S. KELLER 2,672,335

CONTROLLING DEVICE FOR ANTISKID
MEANS FOR VEHICLE BRAKES

Filed June 12, 1951

INVENTOR:

Siegfried Keller

BY

*Richard y Geier*

ATTORNEYS

Patented Mar. 16, 1954

2,672,335

UNITED STATES PATENT OFFICE 2,672,335

CONTROLLING DEVICE FOR ANTISKID MEANS FOR VEHICLE BRAKES

Siegfried Keller, Effretikon, Switzerland, assignor to Machine Tool Works Oerlikon, administration company, Zurich-Oerlikon, Switzerland, a company of Switzerland Application June 12, 1951, Serial No. 231,160

2 Claims. (Cl. 264—1)

The invention relates to a controlling device for anti-skid means for vehicle brakes, particularly for railway train brakes, which comprises in known manner two rotating parts driven by a vehicle axle and which are rotatable relative to each other from a normal position against the action of restoring forces, and which possesses valves each one of which can be operated in one or in the other sense by the relative movement of the two parts.

In the known controlling devices of this kind the rotation of the two parts relative to each other is transformed into axial movements which then serve for operating one or several valves. This system has several disadvantages which reside on the one hand in the friction caused by the parts necessary for the transformation and on the other hand in an increased susceptibility to malfunctions due to rusting and dirt. The latter disadvantage is of particular importance if the control device is arranged as is often customary today in the casing of an axle bearing where sufficient lubrication presents difficulties.

It is an object of the invention to avoid these disadvantages by a simplification of the design of the control device. In accordance with the invention this object is attained by arranging valves in one of the two parts, the valve bodies of which are movable in the direction of the circumference of this part and are connected with the other part in such a way that on rotation of the two parts relative to each other one or the other of the valves is actuated by the movement of its valve body.

Figure 1:
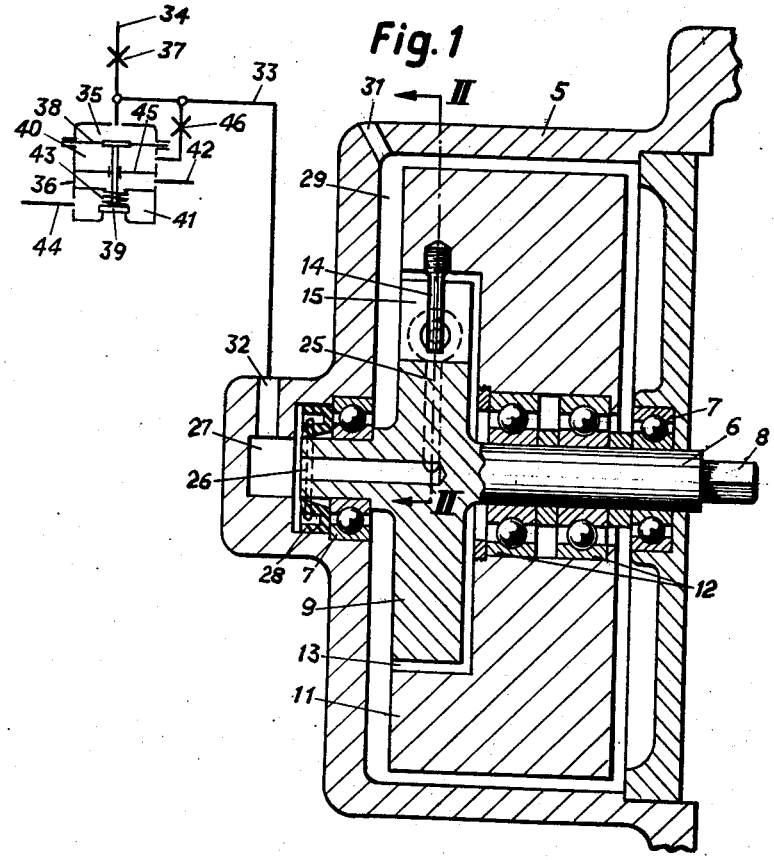
Figure 2:
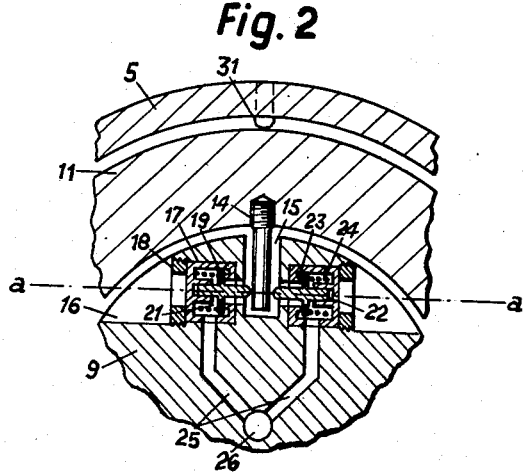

In the following, an embodiment of the invention is described with reference to the drawing in which, Fig. 1 is an axial section through the controlling device with a valve connected thereto, Fig. 2 is a cross-section along the line II—II in Fig. 1.

In the casing 5 into which projects the end of a vehicle axle not shown in the drawing of a railway car, the shaft 6 is rotatably mounted by means of the two ball bearings 7. On the right hand end in Fig. 1 of the shaft 6 the resilient coupling piece 8 is attached through which the rotation of the car axle is transmitted to the shaft 6. The disk 9 is rigidly connected to the shaft 6. The body 11 is rotatably mounted on the shaft 6 by means of the two ball bearings 12. The body 11 is fitted with a cylindrical cavity 13 which houses the disk 9. For rotating the body 11 the latter is provided with a fixed pin 14 projecting into an opening 15 disposed at the circumference of the disk 9.

In the disk 9 two bores 16 are provided the common axis $a$—$a$ of which intersects the pin 14 near its lower end at a right angle, and into each of which a hollow body 17 is screwed by means of a nut 18. Each of these bodies forms a seat 23 for a movable valve body 19 and a guide 21 for a pin 22 carrying the valve body. The ends of the pins 22 project into the opening 15 and contain between them the pin 14 with small play. Helical springs 24 normally press the valve bodies 19 against their seats 23. One bore 25 each connects the interior of the two hollow bodies 17 with a bore 26 running along the axis of the shaft 6 and leading into the space 27 of the casing 5. A sealing ring 28 seals the space 27 against the space 29 in which the disk 9 and the body 11 rotate and with which the inside of the hollow bodies 17 are connected when the valves 19, 23 are open. The bore 31 serves for venting this space. The compressed air duct 33 is connected to a bore 32 in the casing 5 which leads to the space 27. The air duct is connected by another duct 34 with the space 35 of the valve 36 as well as via a throttle bore 37 with an auxiliary air container on the car which is not shown in the drawing. The space 35 is closed by a membrane 38 which is connected with the movable valve body 39. The latter closes, in the rest position shown, the space 41 against the atmosphere to which is connected the brake cylinder not shown by means of a duct 44, and connects the space 41 with the duct 42 leading to the customary control valve. Below the membrane 38 is the space 40 closed by the former and the separating wall 45. The space 40 is connected with the duct 33 via a throttle bore 46. A spring 43 retains the valve body 39 in the rest position shown if the pressure in the chambers 35 and 40 are equal.

The operation of the controlling device described is as follows. When the auxiliary air container is charged the spaces 35, 40 and 27 are subjected to the pressure of this container. The valve 36 is therefore in its rest position in which the brake cylinder is connected with the control valve. From the space 27 the compressed air is led to the interior of the hollow body 17 through the bores 26 and 25, where it is prevented from escaping by the valve bodies 19 pressed against their seats. When the car starts moving the disk 9 is driven via the coupling 8 by the car axle and rotates by means of the pins 14, 22 the body 11. The springs 24 are so powerful that the forces exerted on one or the other of the pins 22 during the accelerations and decelerations of the body 11 due to normal starting or braking of the car are not sufficient to lift the valve body from its seat. However, if the wheel axle is locked due to excessive braking action, one of the valves 19, 23 is opened, depending on the direction in which the axle rotates. The compressed air in the space 35 of the valve 36 then escapes through the duct 33 and the bores 32, 26, 25 and 31 to the atmosphere, and the valve 36 is operated by the pressure in the space 40 which can escape but slowly due to the throttling bore 46. While the duct 42 from the control valve is thereby closed the braking cylinder is vented through the duct 44 and the space 41 to the atmosphere, whereby the brake is released.

Instead of the shown valve 36 controlling the venting of the brake cylinder other arrangements of a generally known type may be used. For example, the valve could be kept closed by the pressure in the braking cylinder during normal braking actions. The valve could also be equipped with a device for artificially lengthening the time during which it is operated to ensure re-acceleration of the wheel axle braked to a standstill.

Though the advantages of the invention are primarily apparent if the controlling device is arranged in the axle bearing casing as shown in the drawing the invention is not limited to this case. The controlling device could also be arranged at any suitable point in the car and could, for example, be driven by belt drive or similar means.

I claim:

1. A rotary inertia device, comprising, in combination, a rotary driving element and a rotary inertia element disposed coaxially to said driving element; a pair of opposed valves in one of said elements, each of said valves comprising a circumferentially movable valve body, a valve seat, and resilient means normally pressing said valve body against said valve seat, means supplying fluid pressure to said valves; and a stop upon the other one of said elements, said stop projecting between the valve bodies and forming along with said valve bodies and said resilient means a driving connection between said elements to rotate said inertia element along with said driving element when the acceleration or deceleration of the driving element does not exceed a predetermined value, whereby when the acceleration or deceleration exceeds said predetermined value a relative rotary movement takes place between the two elements causing the lifting of one of said valve bodies from its valve seat to provide an escape of said fluid to the atmosphere.

2. A rotary inertia device comprising in combination, a first rotary element having a hub part; a non-rotative part forming a pressure chamber into which the said hub part projects; sealing means disposed between the non-rotative part and the hub part to seal the pressure chamber against the atmosphere; a pair of opposed valves in the said first element, each of which is fitted with a circumferentially movable valve body, a conduit in the said first part for connecting the valves and the pressure chamber for venting fluid pressure from the pressure chamber to the atmosphere when the valves are opened, said conduit leading from the said hub part into the pressure chamber; spring means engaging the valve bodies to charge them in opposite direction and to normally close the valves; a second rotatable element disposed coaxially to the said first element; a stop member forming a part of the said second element and projecting between the said valve bodies, said stop member, said valve bodies and said spring means constituting a resilient yielding driving connection between the two elements which, if acceleration or deceleration of the said first element surpasses a predetermined value makes possible a rotation of the second element with respect to the said first element, caused by the inertia of the second element, whereby one of the valves is opened.

SIEGFRIED KELLER.

References Cited in the file of this patent

UNITED STATES PATENTS

| Number | Name | Date |
|---|---|---|
| 2,322,003 | Farmer | June 15, 1943 |
| 2,405,382 | Volet | Aug. 6, 1946 |
| 2,531,054 | Kelley | Nov. 21, 1950 |